(12) United States Patent
Daglis et al.

(10) Patent No.: US 10,929,174 B2
(45) Date of Patent: Feb. 23, 2021

(54) ATOMIC OBJECT READS FOR IN-MEMORY RACK-SCALE COMPUTING

(71) Applicant: ECOLE POLYTECHNIQUE FEDERALE DE LAUSANNE (EPFL), Lausanne (CH)

(72) Inventors: Alexandros Daglis, Saint-Sulpice (CH); Boris Robert Grot, Edinburgh (GB); Babak Falsafi, Chexbres (CH)

(73) Assignee: ECOLE POLYTECHNIQUE FEDERALE DE LAUSANNE (EPFL), Lausanne (CH)

( * ) Notice: Subject to any disclaimer, the term of this patent is extended or adjusted under 35 U.S.C. 154(b) by 79 days.

(21) Appl. No.: 15/838,514

(22) Filed: Dec. 12, 2017

(65) Prior Publication Data

US 2018/0173673 A1 Jun. 21, 2018

(30) Foreign Application Priority Data

Dec. 15, 2016 (EP) .................................... 16204502

(51) Int. Cl.
*G06F 9/46* (2006.01)
*G06F 15/173* (2006.01)
(Continued)

(52) U.S. Cl.
CPC .............. *G06F 9/467* (2013.01); *G06F 9/524* (2013.01); *G06F 9/528* (2013.01);
(Continued)

(58) Field of Classification Search
CPC .... G06F 15/17331; G06F 9/467; G06F 9/524; G06F 9/528; G06F 12/0815;
(Continued)

(56) References Cited

U.S. PATENT DOCUMENTS

| | | | | | |
|---|---|---|---|---|---|
| 5,265,235 | A | * | 11/1993 | Sindhu | ................ G06F 12/0833 711/120 |
| 5,948,062 | A | * | 9/1999 | Tzelnic | ................ G06F 11/1435 709/219 |

(Continued)

OTHER PUBLICATIONS

Manycore Network Interfaces for In-Memory Rack-Scale Computing by Daglis (Year: 2015).*

(Continued)

*Primary Examiner* — Paul M Knight
(74) *Attorney, Agent, or Firm* — Andre Roland S.A.; Nikolaus Schibli

(57) ABSTRACT

A distributed memory system including a plurality of chips, a plurality of nodes that are distributed across the plurality of chips such that each node is comprised within a chip, each node includes a dedicated local memory and a processor core, and each local memory is configured to be accessible over network communication, a network interface for each node, the network interface configured such that a corresponding network interface of each node is integrated in a coherence domain of the chip of the corresponding node, wherein each of the network interfaces are configured to support a one-sided operation, the network interface directly reading or writing in the dedicated local memory of the corresponding node without involving a processor core, and the one-sided operation is configured such that the processor core of a corresponding node uses a protocol to directly inject a remote memory access for read or write request to the network interface of the node, the remote memory access request allowing to read or write an arbitrarily long region of a memory of a remote node.

4 Claims, 8 Drawing Sheets

(51) Int. Cl.

| | |
|---|---|
| G06F 12/0815 | (2016.01) |
| G06F 12/128 | (2016.01) |
| G06F 9/52 | (2006.01) |
| G06F 12/0831 | (2016.01) |
| G06F 12/1081 | (2016.01) |

(52) U.S. Cl.
CPC ...... *G06F 12/0815* (2013.01); *G06F 12/0831* (2013.01); *G06F 12/1081* (2013.01); *G06F 12/128* (2013.01); *G06F 15/17331* (2013.01); *G06F 2212/1041* (2013.01); *G06F 2212/283* (2013.01); *G06F 2212/507* (2013.01)

(58) Field of Classification Search
CPC .... G06F 12/128; G06F 12/1081; G06F 13/28; G06F 2212/1041; G06F 2212/283; G06F 2212/507
See application file for complete search history.

(56) References Cited

U.S. PATENT DOCUMENTS

| | | | | |
|---|---|---|---|---|
| 6,360,220 | B1* | 3/2002 | Forin | G06F 16/9014 |
| 7,234,029 | B2* | 6/2007 | Khare | G06F 12/0817 |
| | | | | 711/100 |
| 7,376,800 | B1 | 5/2008 | Choquette et al. | |
| 7,502,897 | B2 | 3/2009 | Hertzberg et al. | |
| 8,661,204 | B2* | 2/2014 | Dwarkadas | G06F 12/0815 |
| | | | | 711/141 |
| 2003/0079094 | A1 | 4/2003 | Rajwar et al. | |
| 2006/0047917 | A1* | 3/2006 | Godin | G06F 9/526 |
| | | | | 711/146 |
| 2006/0117073 | A1* | 6/2006 | Bosworth | G06F 16/273 |
| 2010/0332771 | A1 | 12/2010 | Gray et al. | |
| 2013/0339629 | A1* | 12/2013 | Alexander | G06F 12/08 |
| | | | | 711/144 |
| 2015/0242251 | A1* | 8/2015 | Guthrie | G06F 9/5033 |
| | | | | 711/137 |
| 2015/0269116 | A1* | 9/2015 | Raikin | B01D 53/9418 |
| | | | | 709/212 |
| 2015/0378632 | A1* | 12/2015 | Gschwind | G06F 9/30047 |
| | | | | 711/130 |
| 2016/0103776 | A1* | 4/2016 | Tune | G06F 13/364 |
| | | | | 710/110 |
| 2016/0364158 | A1* | 12/2016 | Narayanan | G06F 3/0619 |
| 2017/0004085 | A1* | 1/2017 | Guthrie | G06F 12/0811 |
| 2018/0004705 | A1* | 1/2018 | Menachem | G06F 15/17331 |

OTHER PUBLICATIONS

Hybrid Transactional Memory by Damron (Year: 2006).*
FaRM: Fast Remote Memory by Dragojevic (Year: 2014).*
Using One-Sided RDMA Reads to Build a Fast, CPU-Efficient Key-Value Store by Mitchell (Year: 2013).*
A Distributed File Service Based on Optimistic Concurrency Control by Mullender (Year: 1985).*
RDMA Read Based Rendezvous Protocol for MPI over InfiniBand: Design Alternatives and Benefits by Sur (Year: 2006).*
Fast In-memory Transaction Processing using RDMA and HTM by Wei (Year: 2015).*
Blundell, Colin, Milo MK Martin, and Thomas F. Wenisch. "InvisiFence: performance-transparent memory ordering in conventional multi-processors." ACM SIGARCH Computer Architecture News. vol. 37. No. 3. ACM, 2009.
Ceze, Luis, et al. "BulkSC: bulk enforcement of sequential consistency." ACM SIGARCH Computer Architecture News. vol. 35. No. 2. ACM, 2007.
Chafi, Hassan, et al. "A scalable, non-blocking approach to transactional memory." High Performance Computer Architecture, 2007. HPCA 2007. IEEE 13th International Symposium on. IEEE, 2007.
Daglis, Alexandros, et al. "Manycore network interfaces for in-memory rack-scale computing." ACM SIGARCH Computer Architecture News. vol. 43. No. 3. ACM, 2015.
Devietti, Joseph, et al. "DMP: Deterministic shared-memory multiprocessing." IEEE micro 30.1 (2010).
Dragojević, Aleksandar, et al. "FaRM: Fast remote memory." Proceedings of the 11th USENIX Conference on Networked Systems Design and Implementation. 2014.
Franklin, Manoj, and Gurindar S. Sohi. "The expandable split window paradigm for exploiting fine-grain parallelsim." ACM SIGARCH Computer Architecture News 20.2 (1992): 58-67.
Franklin, Manoj, and Gurindar S. Sohi. "ARB: A Hardware Mechanism for Dynamic Reordering of Memory References," IEEE Transactions on Computers, vol. 45.5, 1996, pp. 552-571.
Guiady, Chris, Babak Falsafi, and Terani N. Vijaykumar. "Is sc+ilp=rc?." Computer Architecture, 1999. Proceedings of the 26th International Symposium on. IEEE, 1999.
Hammond, Lance, et al. "Transactional coherence and consistency: Simplifying parallel hardware and software." IEEE Micro 24.6 (2004): 92-103.
Jouppi, Norman P. "Improving direct-mapped cache performance by the addition of a small fully-associative cache and prefetch buffers." Computer Architecture, 1990. Proceedings., 17th Annual International Symposium on. IEEE, 1990.
Kaufmann, Antoine, et al. "FlexNIC: Rethinking Network DMA." HotOS. 2015.
Kaufmann, Antoine, et al. "High performance packet processing with flexnic." ACM SIGPLAN Notices. vol. 51. No. 4. ACM, 2016.
Khan, Behram, et al. "An object-aware hardware transactional memory system." High Performance Computing and Communications, 2008. HPCC'08. 10th IEEE International Conference on. IEEE, 2008.
Mitchell, Christopher, Yifeng Geng, and Jinyang Li. "Using One-Sided RDMA Reads to Build a Fast, CPU-Efficient Key-Value Store." USENIX Annual Technical Conference. 2013.
Muzahid, Abdullah, Shanxiang Qi, and Josep Torrellas. "Vulcan: Hardware support for detecting sequential consistency violations dynamically." Proceedings of the 2012 45th Annual IEEE/ACM International Symposium on Microarchitecture. IEEE Computer Society, 2012.
Novakovic, Stanko, et al. "Scale-out NUMA." ACM SIGPLAN Notices. vol. 49. No. 4. ACM, 2014. APA.
Pugsley, Seth H., et al. "Scalable and reliable communication for hardware transactional memory." Parallel Architectures and Compilation Techniques (PACT), 2008 International Conference on. IEEE, 2008.
Qian, Xuehai, et al. "BulkCommit: scalable and fast commit of atomic blocks in a lazy multiprocessor environment." Proceedings of the 46th Annual IEEE/ACM International Symposium on Microarchitecture. ACM, 2013.
Sethumadhavan, Simha, et al. "Scalable hardware memory disambiguation for high ILP processors." Proceedings of the 36th annual IEEE/ACM International Symposium on Microarchitecture. IEEE Computer Society, 2003.
Wenisch, Thomas F., et al. "Mechanisms for store-wait-free multiprocessors." ACM SIGARCH Computer Architecture News. vol. 35. No. 2. ACM, 2007.

* cited by examiner

| | Source | Destination |
|---|---|---|
| Locking | DrTM | SABRes |
| OCC | FaRM [6], Pilaf [15] | |

TABLE 1: Design space for one-sided atomic object reads.

WQ: Work Queue  CQ: Completion Queue
RGP: Request Generation Pipeline  RCP: Request Completion Pipeline
RRPP: Remote Request Processing Pipeline ▨ Request Generation/Request Completion Pipeline frontend
▮ Request Generation/Request Completion Pipeline backend & R2P2
MC: Memory Controller

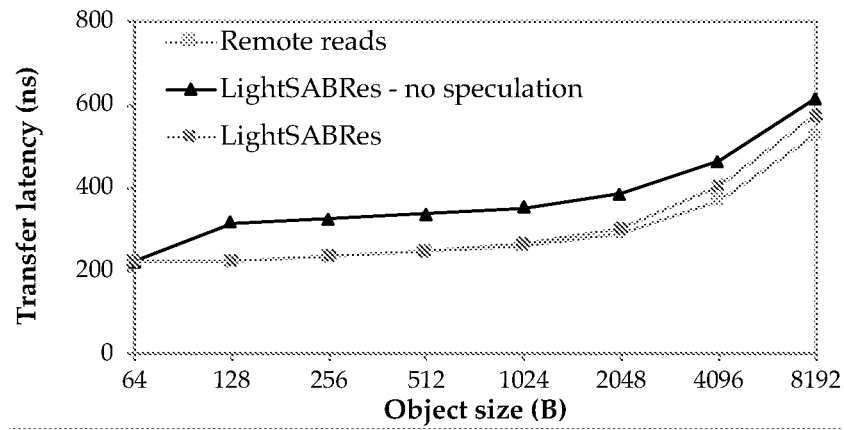
(a) End-to-end latency.
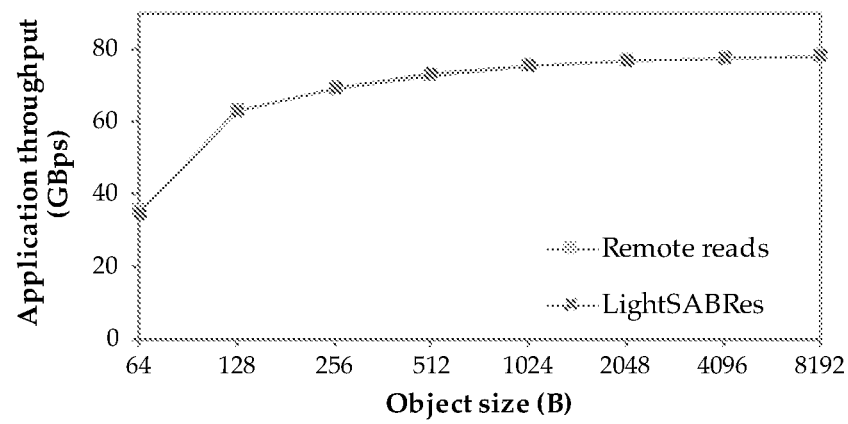
(b) Bandwidth.
Fig. 7

| | |
|---|---|
| Cores | ARM Cortex-A57-like; 64-bit, 2GHz, OoO 3-wide dispatch/retirement, 128-entry ROB, TSO |
| L1 Caches | 32KB 2-way L1d, 48KB 3-way L1i, 64-byte blocks 2 ports, 32 MSHRs, 3-cycle latency (tag+data) |
| LLC | Shared block-interleaved NUCA, 2MB total 16-way, 1 bank/tile, 6-cycle latency |
| Coherence | Directory-based Non-Inclusive MESI |
| Memory | 50ns latency, 4x25.6GBps (DDR4) |
| Interconnect | 2D mesh, 16B links, 3 cycles/hop |
| RMC | 3 independent pipelines (RGP, RCP, R2P2) @ 1GHz one RGP/RCP frontend per core (Fig. 6) four RGP/RCP backends & R2P2s across edge |
| LightSABRes | 16 32-entry stream buffers per R2P2 |
| Network | Fixed 35ns latency per hop, 100GBps |

TABLE 2: System parameters for simulation on Flexus.

FIG. 12

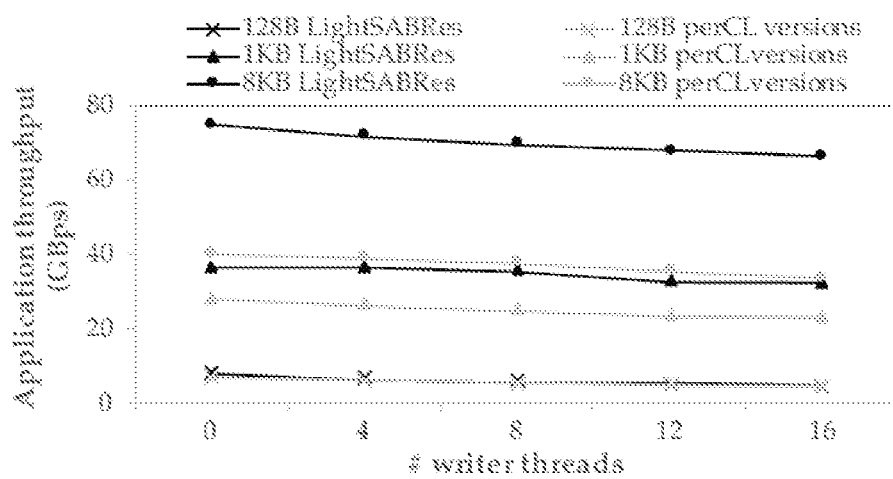

FIG. 8

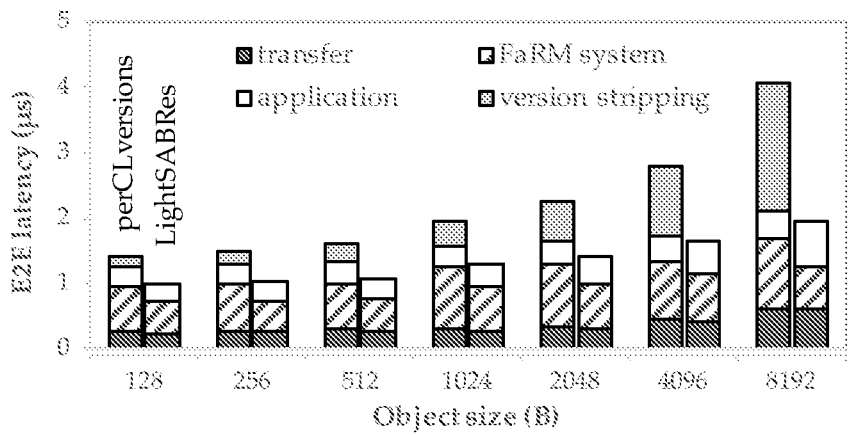
(a) End-to-end latency breakdown.Object
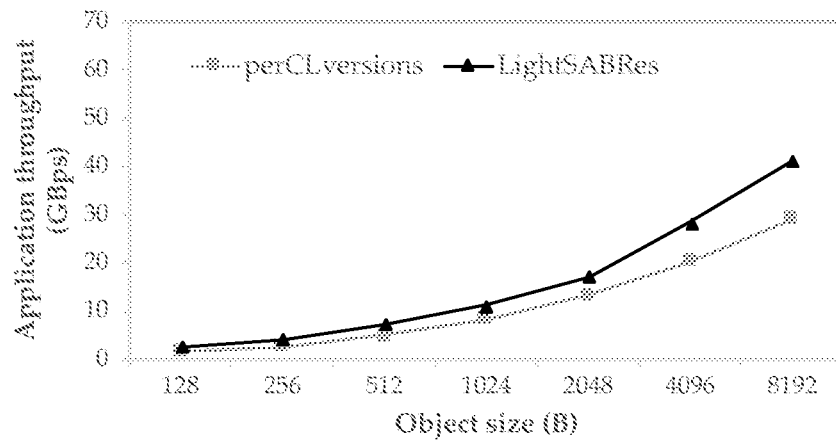
(b) Application throughput.
Fig. 9

ATOMIC OBJECT READS FOR IN-MEMORY RACK-SCALE COMPUTING

CROSS REFERENCE TO RELATED APPLICATIONS

The present application claims priority to European patent application EP 16204502.5 that was filed on Dec. 15, 2016, the entire contents thereof herewith incorporated by reference.

TECHNICAL FIELD

The invention is in the field of in-memory rack scale computing.

BACKGROUND

Large-scale online services operate on massive data with tight latency constraints. To meet these requirements, data is kept in memory-resident data stores (such as key-value stores) distributed across hundreds of servers. With each incoming user request touching several data objects spread across multiple servers, frequent and fine-grain inter-server communication becomes unavoidable. Unfortunately, remote memory access over conventional networking is orders of magnitude slower (1000) than local memory access, significantly diminishing the benefits of keeping the data in memory. Several modern software frameworks for in-memory distributed computing show dramatic performance improvements by moving from conventional to remote direct memory access (RDMA) networking [6], [15]. RDMA technology enables fast direct access to remote memory by offering one-sided operations to completely bypass the remote CPU.

Existing RDMA technologies such as InfiniBand can deliver remote memory access at a latency as low as 10-20 of local memory access (1-2 s vs. 60-100 ns). Emerging rack-scale systems further shrink this gap through tight integration, lean user-level protocols, and high-performance fabrics, bringing remote memory access latency just within a small factor over local memory access [17].

One-sided operations have semantic limitations, which is a direct consequence of their DMA-based implementation on the remote end: while each individual cache block can be accessed atomically, there are no guarantees for larger accesses straddling multiple cache blocks. To overcome this limitation, data management systems leveraging one-sided operations employ software mechanisms such as locks or optimistic concurrency control to enforce atomic remote object accesses [6], [15].

Providing object atomicity in software will gradually become a performance limiter as modern fabrics improve the communication latency and bandwidth. Indeed, our study shows that the state-of-the-art software mechanism delivering atomic object accesses in fast remote memory (FaRM) [6] accounts for up to 50% of the end-to-end remote memory access latency for large objects (8 KB) on Scale-Out NUMA (soNUMA) [17]—an architecture, programming model, and communication protocol for low-latency, distributed in-memory processing. Consequently, providing atomic remote object access becomes a first-order performance concern calling for architectural support to replace the costly software mechanisms.

Because remote object reads represent the most frequent remote memory operation, it is an aim of the invention to introduce a one-sided hardware primitive with the semantics of an atomic remote object read. This is critical to the performance of future tightly integrated rack-scale systems.

SUMMARY

According to one aspect of the present invention, the above discussed problem is addressed by proposing a one-sided operation type, called SABRe (Single-site Atomic Bulk Read), and investigating the design space to provide this one-sided operation type in hardware.

In a first aspect, a distributed memory environment is provided comprising a plurality of chips; a plurality of nodes, distributed across the plurality of chips in such a manner that each node is comprised in a chip, whereby each node comprises a dedicated local memory and at least a processor core, and each local memory is configured to be accessible over network communication; whereby the environment further comprises for each node a network interface, configured such that each node's network interface is integrated in a coherence domain of the chip in which the node is comprised; each of the network interfaces further being configured to support one-sided operations, whereby the network interface directly reads or writes its local node's memory without involving any processor core, whereby the one-sided operation is configured such that the node's processor core uses a protocol to directly inject a remote memory access for read or write request to the network interface of the node, the remote memory access request allowing to read or write an arbitrarily long region of a remote node's memory, a requesting network interface further comprising a parsing means configured to parse the request and send it to a target remote servicing node's network interface, whereby the target remote servicing network interface is configured to directly operate on its local memory according to the received request, without any involvement of the target remote servicing node's processor cores, and to reply to the requesting network interface with the requested data, if the request was a read, or a write acknowledgement, if the request was a write, whereby a plurality of regions of each node's memory are organized by software as a set of data objects, each of the data objects having a standardized layout, comprising a header containing a lock or a version, followed by a data object's data, the network interface relying on the standardized data object memory layout and the integration of the network interface in a local coherence domain of the network interface, to identify a potential atomicity violation by snooping on coherence messages, thus enabling the network interface to perform one-sided atomic data object read operations.

In a preferred embodiment the network interface in a distributed memory environment further comprises a plurality of object buffers, whereby each object buffer comprises an object address field, followed by a plurality of object buffer entries, whereby each object buffer entry is 2 bits intended to encode any one of 4 possible states from the following list: unused, used, pending, done, a default state being unused.

In a second aspect, the invention provides a method for implementing a lightweight mechanism configured to extend a network interface to provide atomic reads of arbitrarily long data objects, each object comprising a header followed by object's data stored in object buffers, whereby the header comprises a lock or a version. The method comprises integrating the network interface in a local coherence domain of the network interface; the network interface snoops on coherence messages, to identify potential atomicity violations while a data object is being read; whenever the network interface receives a remote object read request from the network, the network interface assigns one of the available object buffers to the remote object read request, the network interface stores an object's base address in an object buffer's object address field, and the first N object buffer's entries are marked as used, where N is the total number of cache blocks that the object requested by the remote object read request is comprised of, whereby an object buffer entry (i) corresponds to the requested object's cache block (i); the network interface speculatively sends read requests for the object's cache blocks, marking their corresponding object buffer entries as pending, consequently marking them as done as the data replies from memory arrive and sending the data replies back to the original requester through the network, whereby all data cache block reads completed by the network interface are speculative until the object's header is retrieved and assessed, whereby a state of the lock or a state of the version is assessed; when the state of the lock or the state of the version indicates a free object, a cache block read that has been speculatively completed prior to assessing the object's header qualifies as valid; else, the speculative cache blocks reads fail, and the network interface performs a failure sequence, which involves either one of reading the object again, or sending a failure notification to a network interface that originally sent the remote object read request; in case the network interface receives a coherence invalidation message for an address that belongs in a data object's address range, the network interface checks whether the invalidation matches an object buffer's first entry, which corresponds to the data object's header, and if this is the case, the object read request fails and the network interface performs a failure sequence for that object read request; checks whether the invalidation matches an object buffer's entry that is not unused and is not the first, and if that object buffer's first entry is in the done state, the invalidation is ignored; otherwise, the reception of an invalidation for an object buffer's entry that is in the done state results in the network interface performing a failure sequence for the object read request corresponding to that object buffer; in any other case, the reception of an invalidation is ignored; whereby a one-sided atomic data object read request successfully completes when all the cache blocks comprising the requested object have been read from the memory, whereby the network interface frees the object buffer used for the request by resetting all of the object buffer's entries to unused.

In a further preferred embodiment, the method further comprises checking a number of entries in an object buffer, if the object buffer features fewer entries than the requested data object's total cache lines, binding the number of speculative cache block reads that the network interface can issue for that data object, by the available entries; if the access to the data object's header has not completed, the network interface stalls the processing of that data object's atomic read request until that first access completes, hence only having a negative impact on performance, but not introducing a functionality limitation, meaning that the maximum size of the data object that the network interface can read atomically is not limited by the number of entries of the network interface's object buffers.

The above and other objects, features and advantages of the present invention and the manner of realizing them will become more apparent, and the invention itself will best be understood from a study of the following description with reference to the attached drawings showing some preferred embodiments of the invention.

BRIEF DESCRIPTION OF THE SEVERAL VIEWS OF THE DRAWINGS

The accompanying drawings, which are incorporated herein and constitute part of this specification, illustrate the presently preferred embodiments of the invention, and together with the general description given above and the detailed description given below, serve to explain features of the invention.

FIGS. 7A and 7B illustrate micro-benchmarks with one-sided operations;

FIG. 8 illustrates an app. throughput with increasing conflict rate;

FIGS. 9A and 9B show FaRM KV store—baseline vs. LightSABRes;

FIG. 12 shows a table that contains system parameters for simulation on Flexus.

DETAILED DESCRIPTION OF PREFERRED EMBODIMENTS

Figures 1, 11:
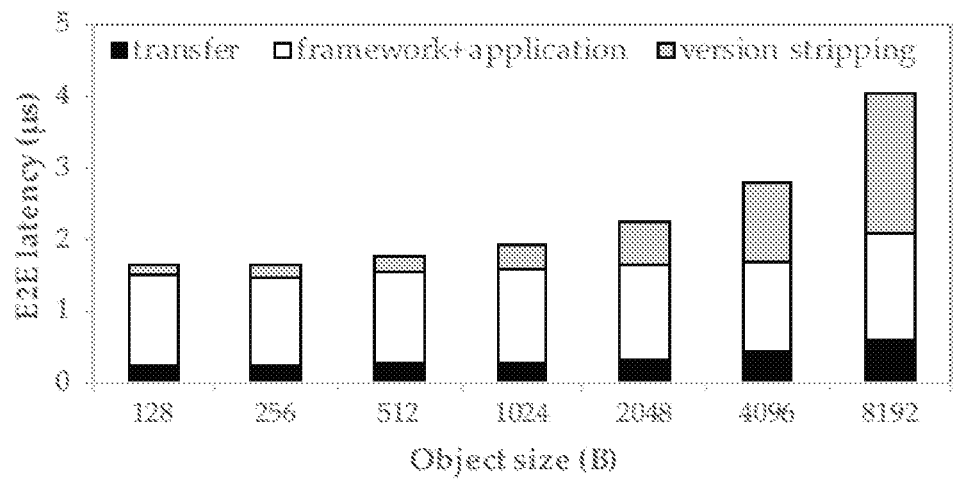
FIG. 1 illustrates end-to-end remote object read latency using the per-cache-line-version software atomicity check mechanism on FaRM over soNUMA according to a preferred embodiment of the invention.
FIG. 11 shows a table that contains design space for one-sided atomic object reads.

The present description of preferred embodiments among others describes an implementation of SABRes and illustrates major performance improvements as compared to a state-of-the-art software mechanism for atomic remote object reads.

The description further treats the following aspects.

A study of the overhead of providing remote object read atomicity in software on emerging rack-scale systems. It is shown that this overhead accounts for a measurable fraction of the end-to-end remote memory access latency: 10-50% for 128B-8 KB objects;

A design space exploration for hardware SABRes, a type of one-sided operation with stronger semantics than any existing one-sided primitive according to an example embodiment of the invention;

LightSABRes, a lightweight and high-performance implementation of SABRes, integrated into the chip's coherence domain to detect object atomicity violations. LightSABRes completely removes the software over-head associated with remote object read atomicity; and An evaluation of LightSABRes on a state-of-the-art rack-scale system, Scale-Out NUMA [17]. It is shown significant throughput improvements for atomic remote reads of 128B-8 KB objects: 15-97% with a micro-benchmark and 30-60% with a key-value store on a full software stack for in-memory distributed computing.

Accordingly, the description herein below is organized as follows. It presents some background in chapter 2, explores the design space for providing SABRes in chapter 3, and describes an example implementation of LightSABRes in chapter 4. Then LightSABRes is coupled with Scale-Out NUMA as a case study in chapter 5, the adopted methodology is detailed in chapter 6, and the resulting system evaluated in chapter 7. Finally, chapter 8 discusses related work and chapter 9 concludes the description.

Modern frameworks for in-memory distributed computing leverage RDMA's low communication latency to dramatically improve the performance of remote memory access [6], [15]. These frameworks build in-memory object stores that take advantage of one-sided operations to deliver fast access to remote objects. Such object stores are the backbone of large-scale online services.

For applications that operate on structured data, the granularity of an operation (and also the minimum unit of transfer when accessing remote memory) is the object. The size of these objects is application-specific, and can range from a few bytes to several kilobytes. Unfortunately, RDMA technology relies on PCIe DMA to transfer data between the memory and the network, and therefore its remote memory access semantics are limited to read, write, and cache-block-sized atomic operations, such as remote CAS. The latter only provide atomic access to a memory region not exceeding a single cache block in size. No existing hardware mechanism can provide atomic access to larger memory regions; thus, the challenge of accessing objects atomically falls on the software.

Atomic One-Sided Operations.

Several modern frameworks for in-memory distributed computing rely on one-sided RDMA operations (e.g., Pilaf [15], FaRM [6], DrTM). One-sided operations deliver fast access to remote memory by completely avoiding re-mote CPU involvement, but offer limited semantics. In most cases, one-sided operations are only used for reads, while writes are sent to the data owner over an RPC. This common design choice simplifies software design and is motivated by the read-dominated nature of most applications.

Currently, a system using one-sided operations for both reads and writes is DrTM. DrTM uses HTM as an enabler for one-sided writes, relying on it to detect local conflicts with incoming remote writes and abort conflicting local reads. While DrTM introduces an interesting design point, the present invention focuses on the common case of one-sided read operations. Because HTM functionality is bounded to its local node's coherence domain, it cannot be directly used for atomic multi-cache-block remote reads.

Modern frameworks rely on software techniques to complement the limited semantics of one-sided operations, which only offer cache-block-sized atomicity. A defining characteristic for these techniques is the employed concurrency control (CC) method: locking vs. optimistic concurrency control (OCC). Combining locking with one-sided reads is simple. Each object in the data store has an associated lock. When a node requires atomic access to a remote object, it issues a first one-sided (cache-block atomic) RDMA CAS operation to acquire the remote object's lock, followed by another one-sided operation to access the object atomically—locking prevents any conflicts.

However, remote lock acquisition comes with two drawbacks. First, it increases the latency of remote memory access by an additional network roundtrip. Second, it introduces fault-tolerance concerns, as a node's failure may result in deployment-wide deadlocks, turning the RDMA cluster into a single failure domain and thus jeopardizing the traditional high resilience of scale-out deployments. The latter concern can be addressed for reads by replacing conventional locks with lease locks, as illustrated by DrTM. Unfortunately, lease locks are sensitive to clock skew across the deployment's machines, and their duration can significantly impact concurrency and abort rates.

OCC addresses the shortcomings of remote locking. Driven by the observation that most workloads are read-dominated, and hence the probability of a conflict is low, OCC relies on conflict detection rather than conflict prevention for high performance (Pilaf [15], FaRM [6]). Since hardware only provides cache-block-sized atomicity, remote reads are paired with ad hoc software-based mechanisms for conflict detection, which do not come for free. For instance, Pilaf [15] embeds a checksum in each object's header as additional metadata. The checksum is recomputed after every update, and remote readers compute the checksum of the object's data to compare it to the object's checksum—a mismatch indicates an atomicity violation. Unfortunately, while conceptually simple, the checksum mechanism is expensive, as the cost of CRC64 is about a dozen CPU cycles per check-summed byte [15]. For KB-sized objects, this overhead can grow to tens of thousands of CPU cycles (i.e., several microseconds) per object transfer.

FaRM [6] introduces a more efficient approach of per-cache-line versions: every object has a 64-bit version in its header, whose 1 least significant bits are replicated in a per-cache-line header. Writers update all versions upon an object update, and readers compare all cache-line versions to detect atomicity violations before consuming the data. While computationally cheaper than checksums, per-cache-line versions still introduce measurable CPU overhead for both readers and writers. More importantly, per-cache-line versions prevent zero-copy object transfers: before the application can use the object, the CPU has to extract the clean data into a buffer by stripping off the embedded per-cache-line versions. This overhead applies to all types of read/write accesses, both local and remote. Despite the overhead, FaRM's per-cache-line versions mechanism is the state-of-the-art approach to provide optimistic and atomic one-sided reads from remote memory.

Emerging Rack-Scale Systems

While RDMA is the leading product in providing fast inter-node communication and remote memory access, its performance is ultimately capped by the latency overhead of the PCIe interface [17]. With single-cache-line RDMA reads exceeding 1 s in latency, the latency of accessing remote memory alone dwarfs the latency of consequent local memory operations, such as the post-transfer data extraction and version checks required when using FaRM's per-cache-line versions technique, which may only account for a few hundred nanoseconds. Thus, FaRM's design choice does not effectively impact the end-to-end latency of one-sided RDMA reads.

However, RDMA technology is evolving, moving away from PCIe and towards tightly integrated solutions. For instance, Applied Micro's X-Gene 2 and Oracle's Sonoma integrate an RDMA controller on chip. The trend towards tight integration is not limited to the chip level. In fact, recent technological advancements have led to the emergence of tightly integrated chassis- and rack-scale systems, such as HP's Moonshot and The Machine, Oracle Exadata, and AMD SeaMicro. These systems interconnect a large number of servers, each with an on-chip network interface (NI), using a supercomputer-like lossless fabric. NI integration and short intra-rack communication distances help reduce communication delays. At the same time, research proposals (e.g., Firebox, Scale-Out NUMA [17]) show how sub-s remote memory access is achievable through the combination of lean network protocols, tight integration, and contained physical scale. In the present description, it is envisioned that emerging rack-scale systems will soon adopt such lightweight network stacks, which, combined with tightly integrated SoCs, will significantly improve the performance of remote memory access in terms of both latency and bandwidth as compared to existing RDMA solutions. In such an environment, any software overhead added to the bare remote memory access latency imposed by the underlying hardware will perceivably increase the end-to-end latency.

The Case for SABRes.

In the context of emerging tightly integrated rack-scale systems, the performance impact of software-based atomicity mechanisms is evaluated. As a case study, we use Scale-Out NUMA (soNUMA) [17] and run a key-value store on top of FaRM [6]. We simulate two directly connected soNUMA nodes to measure the latency breakdown of one-sided remote reads. Object atomicity is achieved through FaRM's per-cache-line versions mechanism. Simulation parameters can be found in x6.

FIG. 1 shows the end-to-end latency breakdown of an atomic remote object read. For every object size, we break down the latency into three components: the soNUMA transfer time, the time spent in the FaRM framework and application code, and the time spent by the core extracting useful data from the transferred object, by stripping off and comparing the per-cache-line versions to check for atomicity violation. We observe that the latency of one-sided reads over soNUMA starts at just 3-4× of local memory access and scales sub-linearly with object size, due to soNUMA's high-bandwidth fabric. In contrast, while the software atomicity check latency is negligible for small objects (10% for 128B objects), it scales almost linearly with object size and thus quickly outgrows the soNUMA transfer latency, ac-counting for 50% of the end-to-end latency for 8 KB objects. Furthermore, a fraction of the latency goes to FaRM buffer management, which is necessary for storing the transferred data, before it is cleaned up and moved to the application's buffer.

In the present description, we introduce a new Single-site Atomic Bulk Read (SABRe) one-sided primitive in hardware that removes the atomicity-associated software overhead and enables zero-copy transfers, by obviating the need for intermediate buffering.

SABRe Design Space

In this section, we investigate the design space for providing the essential hardware support for SABRes. We consider systems that feature on-chip integrated protocol controllers supporting one-sided remote memory operations.

Destination-Side Concurrency Control

FIG. 11 shows a table that summarizes the design space for atomic remote object access, with or without hardware support. In the taxonomy adopted herein, the terms source and destination refer to request processing location rather than data location. Under that definition, all software-based approaches leveraging one-sided operations essentially implement source-side CC since the destination side's CPU is not involved. DrTM relies on acquiring remote locks, with locking explicitly controlled at the source prior to accessing the remote object's data. FaRM and Pilaf implement different OCC mechanisms to enforce atomicity, but as the source has to perform post-transfer atomicity checks, both are source-side mechanisms.

Introducing hardware support expands the design space, with possible source-side or destination-side accelerators. For example, one can easily envision source-side hardware accelerators that deal with hardware checksums or per-cache-line versions. However, such an approach has a number of weaknesses. First, cache-block-sized replies with payloads can arrive out of order. Depending on the mechanism, these replies might need to first be reordered, requiring intermediate buffering (e.g., in the case of check-sums). Second, the application's whole data store needs restructuring just to embed the necessary per-object meta-data that enable atomicity checks for one-sided remote operations. Such restructuring also affects the performance of all local operations (reads & writes), as they have to comply with the modified data layout's rules: readers might need to unpack data before consumption, writers need to always update corresponding metadata as well. Ultimately, the weakness of source-side mechanisms is that they are limited to post-transfer atomicity checks and thus require additional meta-data embedded in—and always transferred with—the requested remote object.

In contrast, destination-side hardware support offers more appealing opportunities. Providing CC directly at the destination is a natural option; this is where the target data is located and, thus, where synchronization between concurrent accesses to that data occurs. Therefore, destination-side CC offers higher flexibility and efficiency, such as leveraging local coherence for online atomicity violation detection and obviating the need to maintain and transfer any additional metadata for post-transfer validation at the source. For instance, locking directly at the destination cancels both drawbacks of remote locking (i.e., increased latency and fault-tolerance concerns). Similarly, reading data optimistically while actively monitoring atomicity at the destination obviates the need for restructuring the data store to embed OCC-specific metadata, and also allows for early conflict detection.

Overall, destination-side CC comes with many desirable properties, which trump source-side alternatives. Therefore, our hardware extensions for SABRes target the data of the right-most column of the table shown in FIG. 11, representing the first destination-side CC solution solely based on one-sided operations.

Design Goals

Given the advantages of destination-side CC, we now define the three design goals (DG) necessary for an efficient SABRe hardware design:

DG1 Minimal single-SABRe latency.

DG2 High inter-SABRe concurrency. The mechanism should be able to utilize all the available band-width even with a multitude of small SABRes.

DG3 Low hardware complexity/cost (e.g., no modifications to the chip's coherence protocol).

A straightforward and efficient approach to implement SABRes is lock acquisition at the destination. Since objects typically have a header with a lock for synchronization between local threads, the controller can acquire the lock as any other local thread. To support high reader concurrency, shared reader locks are essential, yet only add minimal complexity to the locking logic.

For read-dominated applications, OCC is typically preferable to locking. For that reason, many modern software frameworks, such as key-value stores and in-memory DBMSs, do not employ reader locks, but rely on optimistic reads for high reader throughput (e.g., [6]). To enable optimistic reads, objects have a version in their header, which is incremented at the beginning and at the end of each update. To determine a read's atomicity, the controller simply compares the version's value before and after the read. Enhancing the protocol controller at the destination for optimistic reads is also quite simple: instead of acquiring an object's lock, the controller can at any time assess the object's state by reading the object's version.

The biggest drawback of a naive implementation of either mechanism for hardware SABRes (locking, or OCC using version checks) is the requirement for a serialized first access to read the version or acquire the lock prior to any data access. In the general case when the target object is in memory, this requirement can significantly increase the object read latency by exposing the full latency of that first memory access (i.e., 60-100 ns), incurring a considerable latency overhead especially for small objects. To illustrate, on a tightly integrated system such as soNUMA, this serialization can increase the end-to-end latency of a two-cache-block SABRe by up to 40% (details in chapter 7.1). In the case of version comparison, an additional serialized load to re-read the object's version after all data has been read is also required. However, the latency overhead of this second load is less critical, as it will likely hit in an on-chip cache.

Figure 2:
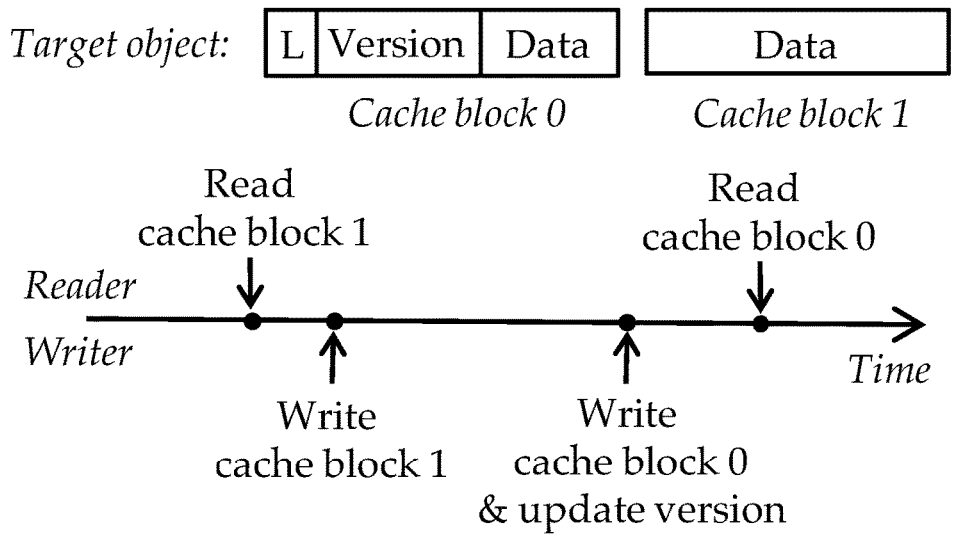
FIG. 2 shows an example of Reader-Writer race.

Violating the read-version-then-data (or acquire-lock-then-read-data) serialization to avoid exposing that latency penalty can result in undetected atomicity violations. FIG. 2 illustrates a potential race condition that may arise if we overlap the version read with data read. In this example, we assume that the protocol controller receives a remote read request for an object that spans two cache blocks and that it implements OCC using the object's header version (the example equally holds in the case of locking). Cache block 0 contains the object's header, with the corresponding lock and version, and a writer currently holds the object's lock. If the controller issues a read for cache blocks 0 and 1 concurrently, the read for cache block 1 may complete first, as any reordering can occur in the memory subsystem and on-chip network. Then, the writer modifies cache block 1, updates the object's version and frees the lock (cache block 0). After this intervention, the controller's read for cache block 0 also completes, finding a free lock. At this point, the controller has no means of detecting the writer's intervention and wrongly assumes that the object has been read atomically, while in practice it has retrieved the latest value of cache block 0 and an old value of cache block 1. Reading the object's version before issuing any other read operation, though, guarantees that such races causing transparent atomicity violations cannot occur.

A careful implementation of the simple hardware SABRe mechanisms mentioned above can satisfy DG2 and DG3 (i.e., high inter-SABRe concurrency and low hardware complexity), but not DG1 (i.e., minimal single-SABRe latency), because of the serialization limitation. We can break the read-version-then-data problem by leveraging speculation techniques. The tight integration of the protocol controllers with the chip also implies integration into the chip's coherence domain. This integration enables a variety of options regarding atomicity enforcement mechanisms. Speculation techniques proposed for relaxing memory ordering (e.g., fence speculation) [1], [9], [16], or conflict detection and resolution mechanisms employed by HTM could be directly applicable to register and guard a SABRe's address range during its lifetime. However, those mechanisms are unnecessarily complex and contradict DG3.

Our key insight is that SABRes require considerably simpler functionality than HTM or other sophisticated speculative structures employed by aggressive cores to relax memory order. First, SABRes only involve reads and no writes. Second, SABRes naturally come with software-provided characteristics that can simplify hardware requirements; that is, SABRes are by definition accesses to structured data that comprise objects in a data store rather than accesses to arbitrary memory locations. Every object typically features a header with associated metadata, such as a lock and/or a version, and a range of sequential addresses containing data. Writers update this header accordingly upon each write to the object. We can thus expose these semantics to the hardware, and rely on a hardware-software contract to simplify the hardware.

Safely Overlapping Lock & Data Access

We now leverage our insights from chapter with the design goals to design a lightweight hardware mechanism that safely overlaps an object's lock/version access and data read, meeting DG1. It is possible to hide the serialization latency and read all data in parallel instead, thus extracting maximum memory-level parallelism (MLP), as long as we provide a mechanism to detect any data atomicity violation that may occur before the completion of the object's first version read or lock acquisition. Since memory accesses can be reordered by the memory subsystem, requested data may return in any order. We define the time between issuing an access to the SABRe's first cache block, which contains the object's version or lock, and its completion, as that SABRe's window of vulnerability. Within that window, all data are speculatively read, as it is unknown whether the read operation is racing against a concurrent write to the same object, risking a transparent atomicity violation as in the example of FIG. 2.

We rely on the integration of the protocol controller in the chip's coherence domain to detect atomicity violations during this window of vulnerability. Given that a SABRe comprises a sequence of reads to consecutive addresses, the mechanism only needs to snoop coherence traffic for an address range rather than a set of independent addresses. At the high level, such range tracking can be trivially implemented by a structure that just keeps track of a SABRe's starting address and length, allowing for simple indexed lookups through simple base-and-offset arithmetic. Using this structure, the loads comprising a SABRe can be performed in parallel, exploiting maximum MLP. The critical addresses are trivially captured as an address range and are snooped upon each reception of a coherence invalidation message during the window of vulnerability. An invalidation matching an address of an already read block triggers an abort of the corresponding SABRe.

Implementing such address range snooping structure in hardware is much simpler than an out-of-order processor's load-store queue, or an address resolution buffer [7], [8], [20]: no dynamic memory disambiguation or associative searches, within or across different address range snooping structures are required. We provide an implementation of the proposed mechanism in the following section.

LightSABRes

In this section we describe LightSABRes, an implementation of a destination-side CC mechanism for SABRes that performs address range snooping using stream buffers. We assume a generic on-chip protocol controller for one-sided operations integrated into the chip's coherence domain.

Address Range Snooping Implementation.

Figure 3:
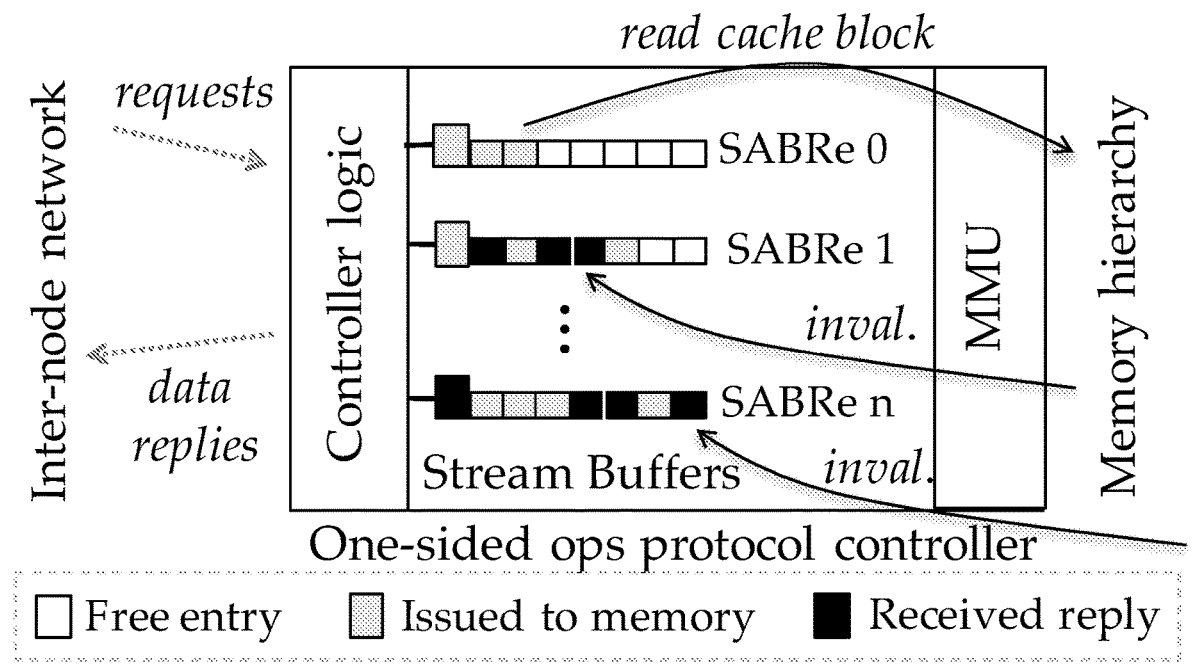
FIG. 3 shows stream buffer to safely overlap lock & data access.

We implement address range snooping by leveraging an adaptation of stream buffers [11], illustrated in FIG. 3.

Every inbound SABRe request is associated with a stream buffer; starting from the SABRe's base physical address, each SABRe cache block is mapped to an entry of the associated stream buffer. Since all blocks comprising a SABRe are consecutive, issued loads for the same SABRe map to consecutive stream buffer slots (with the exception of SABRes spanning two non-consecutive physical pages).

The stream buffer holds the range of addresses touched by the controller during the window of vulnerability.

Integration of such stream buffers with the protocol controller allows overlapping the object's lock/version access and data read, thus enabling maximum MLP for a single SABRe even during the window of vulnerability. The controller can keep pushing consecutive cache-block-sized read requests to the memory hierarchy as long as (i) the SABRe's associated stream buffer is deep enough to contain all the outstanding loads; and (ii) there is no boundary crossing between two non-consecutive physical pages. If the controller hits any of these two limitations while issuing loads for a SABRe, that SABRe simply needs to stall, without any correctness implications. Once the window of vulnerability is over (i.e., the version/lock is accessed), the stream buffer is not useful anymore and reading the object's data can seamlessly continue without the previous two limitations. Page boundary crossing during the window of vulnerability is an infrequent event that does not raise performance concerns, especially given the common RDMA/soNUMA practice of using superpages for the memory regions exposed to the global address space (e.g., [6]).

A stream buffer's entries represent a sequence of loads to consecutive physical memory addresses. With the exception of the head entry, stream buffer entries do not store an address. Instead, each entry's corresponding address is deduced as a simple addition of the stream buffer's associated base address and its location offset. This property provides a cheap lookup mechanism through simple indexing rather than associative search. Data replies arriving from the memory hierarchy are not stored in the stream buffer either, but are directly sent back to the requester by the protocol controller.

In the example of FIG. 3, white stream buffer entries are currently unused, gray entries denote cache-block accesses that have been issued to the memory hierarchy and await a reply, while black entries have already received a reply and the payload has already been sent back to the requester. The controller issues the third cache-block read request for SABRe 0. At the same time, a coherence invalidation message is received for SABRe 1's fifth cache block. Since SABRe 1's head cache block has not yet been accessed, this invalidation indicates a possible race condition with a writer, so SABRe 1 will abort. In contrast, SABRe n does not abort upon reception of an invalidation for its last stream buffer entry, as it has already accessed the head entry's block; this invalidation must have been triggered by an eviction.

The key insight regarding stream buffer provisioning that makes our mechanism lightweight and scalable is that both the number and depth of required stream buffers is orthogonal to the SABRe's length. Sizing is only a function of the memory hierarchy and the target peak bandwidth of the controller that is enhanced with LightSABRes. The number of stream buffers defines the maximum number of concurrent SABRes the controller can handle; there should be enough stream buffers to allow the controller to utilize its full aggregate bandwidth even for the smallest SABRes (i.e., two-cache-block SABRes). The depth of the stream buffers affects the latency of each SABRe. The controller can keep pushing cache block load requests for a SABRe, as long as there are available slots in that SABRe's corresponding stream buffer or the target object's version has been read (or, in the case of locking, the object's lock has been acquired). Thus, the stream buffer's depth should be sufficient to allow pushing data load requests to the memory subsystem at the controller's maximum bandwidth, until the first request to access the object's version/lock completes.

System Integration

As discussed in chapter of the design goals, several modern software frameworks rely on OCC, allowing readers to optimistically proceed without acquiring any locks, as conflicts are expected to be rare and retries are cheap. Without loss of generality, we will focus the implementation description of LightSABRes on an OCC mechanism. The same principles are applicable to locking; in fact, the same implementation with minimal modifications can be used for both locking and OCC.

We assume that the software maintains versions for CC similar in philosophy to Masstree's object versions. Each object has a version in its header. Writers increment the version to acquire exclusive access to an object, and increment it again once they are done with their changes. Thus, an odd version indicates a locked object, and an even version indicates a free object. This is functionally equivalent to having a lock acquired before updating an object, and a version incremented before the lock is freed again. Therefore, without loss of generality, we assume that writers use the odd/even version mechanism for updates.

Figure 4:
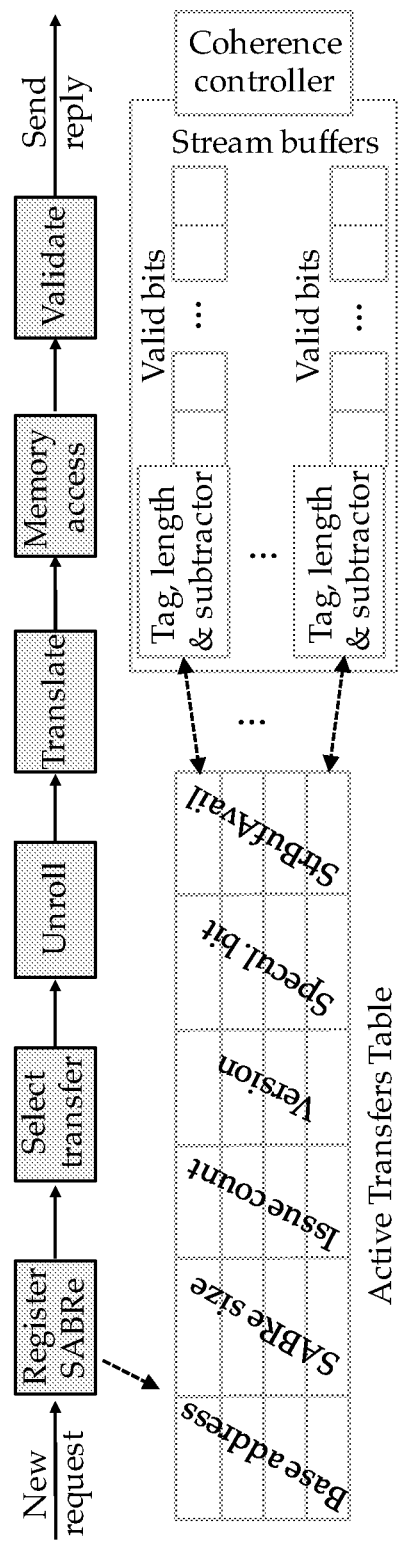
FIG. 4 shows an R2P2 microarchitecture.

FIG. 4 shows a LightSABRes-enhanced protocol controller pipeline, which we refer to as R2P2. The key entity driving a SABRe's progress is an SRAM structure, dubbed Active Transfers Table (ATT). An ATT entry represents a SABRe during its lifetime. Every ATT entry controls an associated stream buffer, and every stream buffer holds a base address, a length field, and a bitvector representing a range of consecutive cache blocks following the base address, with each bit representing a cache block. A set bit indicates that the cache block has been read from the memory subsystem. Each stream buffer also features a subtractor, used to determine whether a message from the memory hierarchy (reply or snoop) matches an entry in the stream buffer by subtracting the stream buffer's base address from the received address to index the bitvector. This simple lookup mechanism eliminates associative searches within each stream buffer.

Upon the reception of a new SABRe request, the register SABRe stage allocates a new entry in the ATT; the request carries the SABRe size and base address. The select transfer stage is a simple SABRe scheduler that selects one of the active SABRes in the ATT and starts unrolling it. The unroll stage issues load requests for the registered SABRe and increments the issue count while (i) issue count<SABRe size, and (ii) there is a free slot in the associated stream buffer (StrBufAvail), or the object's version has already been read, so the SABRe is past its window of vulnerability (speculation bit cleared). If condition (ii) is not met, the serviced SABRe gets descheduled and the select transfer stage starts servicing another active SABRe.

For every reply that arrives to the R2P2, all stream buffers are snooped to check for an address match in their tracked address range; upon a match, the corresponding bit of the bitvector is set. A similar match is triggered by received invalidation messages; if the invalidated address matches a valid entry in a stream buffer (entry's bit set), the invalidation is propagated to the stream buffer's correspond-ing ATT entry. If the version for that SABRe hasn't yet been read (speculation bit set), this event implies a race condition with a writer, and therefore the SABRe aborts. Otherwise, if the version has already been read (speculation bit cleared), the invalidation is ignored, as it has to be triggered by a cache block's eviction from the chip.

The only ambiguous event is the reception of an invalidation for a stream buffer's base address, which represents the block that holds the target object's version. Such an invalidation message may be triggered by a real conflict from a writer concurrently writing the same object, or may be a false alarm triggered by the block's eviction from the chip. To avoid false conflicts, an invalidation for the SABRe's base address does not automatically abort the SABRe. Instead, we deploy the following mechanism: every cache block read from the memory hierarchy is directly sent back to the requester, and, after all payload replies for a SABRe have been sent back, the R2P2 sends a final payload-free packet indicating the transfer's atomicity success or failure. Whenever a SABRe's data accesses finish and the base address entry is still valid in the corresponding stream buffer, the R2P2 immediately confirms the SABRe's success. In the uncommon event of an invalidation reception for the SABRe's base block, the R2P2 must verify whether there was a true atomicity violation: after all data blocks for the SABRe have been read, the R2P2's Validate stage reads the object's header again and checks if the newly read version matches the ATT entry's version field (initialized the first time the object's header was read). A version match guarantees atomicity, while a mismatch implies atomicity violation and causes a SABRe abort.

The relative location of the lock/version in each object's header with respect to its base address is fixed for a given data store, but may vary across data stores. While Light-SABRes require this information, a device driver can trivially specify that at initialization time, when it registers the data store's memory to the protocol controller, thus associating that metadata with the registered memory chunk.

LightSABRes on Scale-Out NUMA

Figure 5:
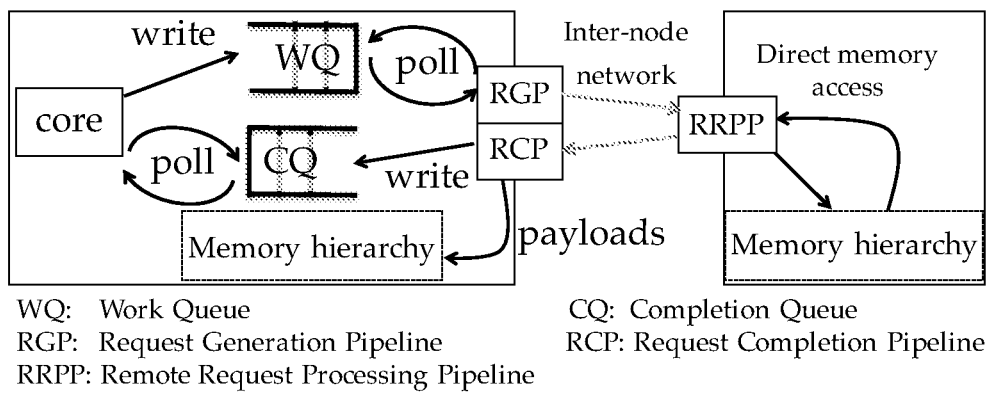
FIG. 5 shows a soNUMA remote read illustration.

We now integrate LightSABRes into soNUMA [17], a state-of-the-art rack-scale architecture, as a case study. We first provide a basic overview of soNUMA and its key characteristics affecting the integration.

soNUMA is a programming model, architecture, and communication protocol for low-latency, high-bandwidth in-memory computing and data serving. A soNUMA cluster consists of multiple SoC server nodes connected by an inter-node fabric. Nodes communicate via one-sided remote read and write operations, similar to RDMA. Remote accesses spanning multiple cache blocks are unrolled into cache-block-sized requests at the source node. Source unrolling was a conscious choice of key importance in the original soNUMA protocol design, as it facilitates transport-layer flow control by forcing a strict request-reply scheme.

soNUMA's protocol controller, the Remote Memory Controller (RMC), is directly integrated into the chip's coherence domain and handles the remote memory access requests scheduled by the cores. FIG. 5 shows the three distinct stages every request goes through: generated at the requesting node, serviced at a remote node, and completed once it returns to the requesting node. These three logical stages are handled by three independent pipelines. Request generations and completions are communicated between the cores and the RMC pipelines through memory-mapped and cacheable queues, a Work Queue for new requests and a Completion Queue for completed requests, as in RDMA. Because LightSABRes only involve destination-side processing, we only focus on the remote end's pipeline, namely the Remote Request Processing Pipeline, which statelessly services incoming remote requests by reading or writing local memory. A more detailed description of soNUMA and its pipelines can be found in [17].

Adaptation to soNUMA's Requirements.

The two key characteristics we need to take special care of in a LightSABRes implementation for soNUMA are the source unrolling of requests and the one-to-one request-reply invariant. At the high level, while soNUMA's Remote Request Processing Pipeline originally serves cache-block-sized requests in a stateless manner, SABRes inherently require some state: request packets belonging to the same SABRe are related. Now transformed into an R2P2, the pipeline gradually folds the received request packets belonging to the same SABRe into a single entry. For that purpose, we add two more fields to the ATT: the SABRe id and the request counter. A new SABRe is registered in the ATT by a special SABRe registration packet, with a SABRe id uniquely defined by the set of source node id, Request Generation Pipeline id, and transfer id, all of which are carried in each request packet. A registered SABRe's request counter is incremented for every consequent request packet belonging to the same SABRe (matching SABRe id). An additional limitation to the unroll stage is that requests to the memory hierarchy can be issued only if issue count<request counter as well, to guarantee that the number of generated replies never exceeds the number of received requests.

Upon a SABRe abort, the R2P2 could transparently retry the failed SABRe. However, we consciously opt out of this approach for two reasons. First, retrying a failed SABRe in hardware will directly increase the occupancy of the R2P2 and also transparently increase the remote read's completion latency for an arbitrary amount of time from the application's perspective. Second, unless a conflict is detected on the first data block read, retrying a failed SABRe at the remote end will result in repeating some reply packets, thus breaking the request-reply flow control invariant of soNUMA. We choose to make the common case fast and expose the uncommon case of atomicity violation to software, to provide end-to-end control and flexibility. The application decides whether to retry an optimistic read after a backoff, or read the object over an RPC. Such policies are hard to implement solely in hardware, and the expected low abort rates do not justify the complexity and effort.

Properly sizing the ATT and the stream buffers, both in terms of number and depth, is key to the LightSABRes' performance. As detailed in x4.1, sizing is determined by the chip's memory hierarchy and the R2P2's target peak bandwidth. For our modeled 16-core system with an average memory access latency of 90 ns and a target per-R2P2 peak bandwidth of 20 GBps, we equip the LightSABRes with 16 stream buffers (one per ATT entry) and a depth (bitvector width) of 32, numbers simply derived by our target bandwidth-delay product (Little's Law). With 24 bytes per ATT entry and 11 bytes per stream buffer, the total additional per-R2P2 hardware requirement is 560 bytes of SRAM storage, plus a 42-bit subtractor per stream buffer.

Multicore chips may feature multiple R2P2s (e.g., [4]), which introduces a load-balancing concern for incoming SABRes. Since SABRes can be arbitrarily long and can differ in size, distributing a single SABRe across multi-ple R2P2s results in finer-grain load balancing. However, such distribution requires breaking a SABRe operation into multiple sub-operations that all together have to be atomic, introducing additional hardware design complexity. Furthermore, given that each transfer originates from a single Request Generation Pipeline, all reply packets have to be routed back to that pipeline's matching Request Completion Pipeline, which will ultimately become the transfer's bandwidth bottleneck. Therefore, the additional complexity required for inter-SABRe distribution seems unwarranted and our LightSABRes implementation for soNUMA maps each SABRe to a single R2P2.

soNUMA Protocol & Hardware Extensions.

Enhancing soNUMA with SABRe operations requires some modifications to the protocol and the remaining two RMC pipelines, namely the Request Generation and Request Completion Pipeline. The hardware-software interface is enhanced with a new SABRe operation type and an additional success field in the Completion Queue entry. This field is used by the Request Completion Pipeline in the Completion Queue entry to expose SABRe atomicity violations to the application. At the transport layer, we add two new packet types. The first is the SABRe registration packet, which precedes the SABRe's data request packets and contains the SABRe's total size; this is essential for the SABRe's registration at the destination node's R2P2 ATT. We assume a network that guarantees in-order packet delivery, but the mechanism can be easily extended to unordered networks, by carrying that information in every request packet. The second new packet type is the SABRe validation, which is the last reply sent by the R2P2 to indicate a SABRe's atomicity success or failure.

The Request Generation and Request Completion Pipelines need to comply with the aforementioned protocol changes. The former pipeline is extended to recognize the new SABRe request type and send a first SABRe registration packet to the destination before unrolling the data request packets. The latter pipeline is extended to recognize the SABRe validation packets carrying the success/failure information for a SABRe, and to encode the SABRe's success in the corresponding field of the Completion Queue entry upon reception of the SABRe's last reply packet.

Methodology.

Figure 6:
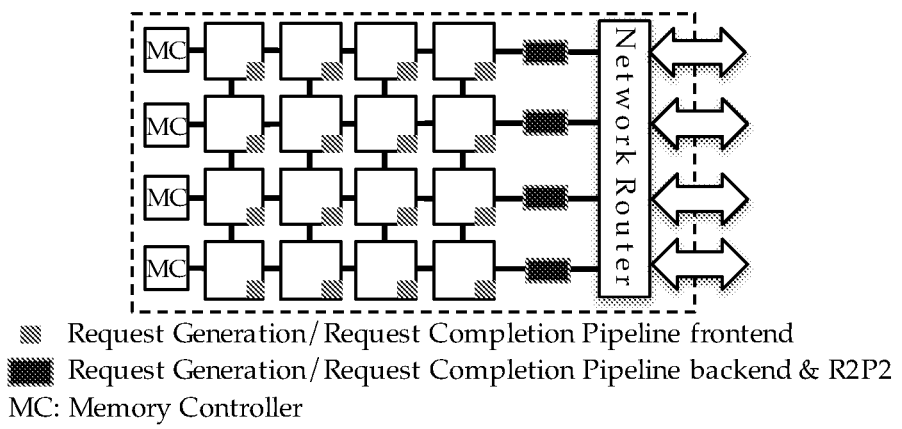
FIG. 6 shows a multicore chip with multiple split RMCs.

Regarding the system organization, we evaluate LightSABRes by modeling two directly connected 16-core chips that implement soNUMA and have their RMCs enhanced with our proposed extensions. FIG. 6 shows the layout of the modeled chips, which implement a state-of-the-art many-core NI design. Each chip features multiple RMCs in a split-NI configuration [4]. Request Generation and Request Completion Pipelines (RGP and RCP) are split into frontends and backends; frontends are replicated per core and handle the memory-mapped queue-based interaction with the cores, while backends are replicated across the chip's edge, for efficient data handling. R2P2s are monolithic and replicated across the chip's edge.

Regarding simulation, we use Flexus, a full-system cycle-accurate simulator, to evaluate our LightSABRes-enhanced soNUMA system. The table shown in FIG. 12 summarizes the used parameters.

Regarding applications, we use a simple microbenchmark to study the performance of LightSABRes in isolation. Our micro-benchmark launches a number of writer threads that update objects in their local memory, or reader threads that access objects in remote memory using one-sided soNUMA oper-ations (remote reads or SABRes) in a tight loop.

We also use FaRM [6] to evaluate the effect of LightSABRes on a full software stack. FaRM is a transactional system for distributed memory with an underlying key-value data store, that uses RDMA for fast remote memory access. In particular, FaRM uses one-sided reads to access remote objects over RDMA, while writes are always sent to the data owner over an RPC. FaRM implements atomic remote object reads via optimistic concurrency control by encoding per-cache-line versions in the objects. The framework detects atomicity violations for (local or remote) reads, should they overlap with a concurrent write to the same object, and retries the read operation. FaRM provides a fast path for lock-free single-object remote read operations, which are strictly serializable with FaRM's general distributed transactions, without invoking the distributed transactional commit protocol. As discussed extensively in x2.1, the per-cache-line versions mechanism imposes CPU overheads related to extracting the useful data from the data store and also requires intermediate system-managed buffering before exposing the data to the application, giving up on the zero-copy benefit that one-sided reads can provide.

We performed the following major modifications to FaRM: (i) we ported the FaRM core from a standard RDMA interface to soNUMA [17]; (ii) because of the current constraints of soNUMA and Flexus, we ported FaRM from Windows/x86 to Solaris/UltraSPARC III. We also replaced a number of system calls in FaRM, such as timer-related calls, with their most efficient counterparts on Solaris.

We evaluate two implementations of atomic lock-free reads with different object layouts in the FaRM data store. In the baseline implementation, we use soNUMA's remote read primitives combined with the original FaRM data object store (per-cache-line versions layout) and post-transfer atomicity checks in software. In the SABRe implementation, we remove these per-cache-line versions from the objects' layout and use LightSABRes to enforce atomicity. The SABRe implementation also removes the intermediate buffering for the data transferred from remote memory; instead, the one-sided operation can directly write the—already clean—data into the application buffer (zero-copy).

Evaluation

For latency and throughput characterization, we first use a single-threaded microbenchmark that is-sues synchronous operations, remote reads and SABRes, to assess their latency. To illustrate the benefit of the Light-SABRes mechanism over a basic hardware mechanism for SABRes that serializes the version check before data access, we evaluate the performance of both mechanisms (Light-SABRes vs. LightSABRes—no speculation). Remote data is memory resident and the local buffer at the source is LLC resident. FIG. 7a shows the soNUMA transfer latency (from issuing to completion) as a function of the transfer size. For single-block transfers, remote reads and both types of LightSABRes achieve the same latency, as expected. For larger transfers, the latency of SABRes using the LightSABRes—no speculation mechanism is significantly higher than remote reads, because of the read-version-then-data serialization. LightSABRes successfully remove this overhead, matching the latency of remote reads. The latency difference between remote reads and LightSABRes in the case of large transfers (>2 KB) is attributed to the load distribution to R2P2s: while remote reads are balanced on a per-block basis across R2P2s, each SABRe is assigned to a single R2P2.

FIG. 7B shows the peak throughput of 16 threads is-suing asynchronous remote operations (remote reads and SABRes). The remote reads and LightSABRes have identical throughput curves, illustrating that (i) peak theoretical bandwidth (20 GBps per R2P2) is reached with both operation types, and (ii) introducing state at the R2P2s does not hurt throughput. The throughput curve of LightSABRes—no spec. is also identical, and therefore omitted.

Conflict Sensitivity

We extend the synchronous microbenchmark used in chapter of the latency and throughput characterization to evaluate the end-to-end effect of LightSABRes in the presence of atomicity violations. We use the per-cache-line versions technique to provide atomicity in software, using remote reads. After every transfer, the micro-benchmark unpacks the transferred data into an application buffer, checking for atomicity violation in the process. With LightSABRes, such an atomicity check mechanism is not required. In both cases, the end result is the same: a remote operation completes when the clean data is read by the core.

We employ 16 reader threads on one chip and vary the number of writers from 0 to 16 on the other, for a throughput sensitivity analysis as the conflict probability grows. To achieve a perceivable change in conflict probability, we limit the number of objects to 100, making all accesses LLC resident. Readers access all remote objects uniformly at random, while each writer repeatedly writes a predefined subset of the objects (Concurrent Reads Exclusive Writes model). Upon a conflict detection, readers immediately retry reading the same object again.

FIG. 8 compares the microbenchmark's throughput for remote atomic reads of 128B, 1 KB, and 8 KB objects, when using the software per-cache-line versions mechanism versus LightSABRes. In all cases, we observe a performance degradation as the number of writers, and, hence, the conflict probability, increases. The throughput difference between the software and hardware atomicity enforcement method is a direct result of the reduced end-to-end latency delivered by LightSABRes. We observe an opposite trend for small and large objects. For 128B objects, the application throughput gap between LightSABRes and the software mechanism shrinks from 15% to 3% as the conflict probability increases. In contrast, for 1 KB and 8 KB objects, the throughput gap grows from 30% to 41%, and from 87% to 97%, respectively. The reason for these differences is two-fold. First, the benefit from removing the software atomicity check is proportional to the object size. Second, atomicity success or failure of completed SABRes is directly exposed to the application through the transfer's Completion Queue entry. This action is object size agnostic. In contrast, the cost of software atomicity detection grows with the object size. Therefore, the larger the object size and the conflict probability, the greater the benefit for LightSABRes.

FaRM

We conclude the evaluation by combining LightSABRes with a read-only key-value store application running on top of FaRM [6]. The first node allocates a number of FaRM objects in its memory, which a single reader thread running on the second node accesses continuously by issuing key-value lookups over synchronous one-sided operations: remote reads vs. SABRes. All remote memory accesses miss in the remote LLC and go to main memory.

FIG. 9A shows the latency breakdown for different object sizes and each of the two evaluated FaRM versions (baseline vs. SABRes). LightSABRes considerably reduce the end-to-end latency for atomic remote object reads for all object sizes. We identify two main sources of benefit. The direct benefit comes from the fact that SABRes completely remove the software overhead of version stripping and atomicity checking. The second, implicit, benefit is that SABRes shrink the total instruction footprint, thus reducing frontend stalls, which are critical to performance and a major concern in modern server workloads. As pointed out in the methodology, SABRes not only deprecate the code for soft-ware atomicity checks, but also the FaRM code that deals with intermediate buffering, as SABRes allow soNUMA to directly write into the application buffer (zero-copy). We found the application's instruction working set to be in the 40-50 KB range, which results in L1i conflict misses, even though we deploy a next-line instruction prefetcher. The use of SABRes reduces the instruction working set by 7%, relaxing core frontend pressure. The use of SABRes only increases the application's latency component (FIG. 9A), be-cause the accessed object is located in the LLC, as opposed to the baseline where the software atomicity check implicitly brings the clean object in the L1d.

The application has two distinct phases: a low ILP/MLP phase with an IPC of 0.8 to 1, and a high-MLP phase, when the transferred remote data is read by the core. In the case of small objects, the largest fraction of the performance benefit provided by SABRes comes from the first phase. The combination of reduced instruction footprint (no version stripping or intermediate buffering code) and a slightly reduced instruction miss ratio results in a 35% overall latency improvement for 128B remote object accesses.

In contrast, the greatest benefit of SABRes for large objects comes from the high-MLP phase, increasing the performance benefit to 52% for 8 KB objects. We do not model a data prefetcher, which would be capable of shrinking the gap between SABRes and the baseline for large objects. However, we significantly optimized the version stripping kernel by hand-tuning assembly code to maximize the MLP, at 1 KB data chunks; thus, our results for object sizes up to 1 KB are guaranteed to get maximum MLP, which a data prefetcher would not improve. Assuming a perfect data prefetcher that identifies the access to an object and directly brings all of it in the L1d, so that only the LLC access latency of accessing the first 1 KB is exposed, the performance benefit of using SABRes would shrink from 52% to 30-35% for 8 KB objects.

The latency benefit of using LightSABRes also results in throughput improvement. We now use 15 FaRM reader threads that access remote objects using synchronous remote operations (reads or SABRes). FIG. 9B shows that LightSABRes deliver a throughput improvement of 30-60% depending on the object size, as compared to the baseline.

Figure 10:
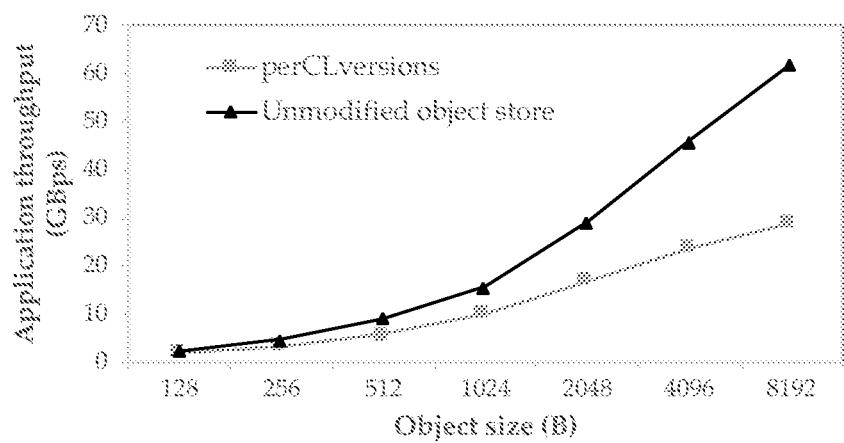
FIG. 10 shows a FaRM local reads throughput comparison.

Finally, we evaluate the performance of local reads for the two FaRM object store implementations. While Light-SABRes are not involved in local accesses, they are an enabler for keeping the object store unmodified (i.e., no per-cache-line versions), which implicitly results in faster local reads. FIG. 10 shows the application throughput achieved for a read-only key-value lookup kernel on FaRM, with 15 FaRM reader threads issuing read requests to local memory only. We observe a throughput increase of 20% for 128B objects, which grows to 53% for 1 KB objects, and a strik-ing 2.1 for 8 KB objects. Thus, using LightSABRes also results in a substantial acceleration of local reads, which are performance-critical even in distributed memory environ-ments, especially in the case of locality-aware applications.

Related Work

RPCs. In this work, we focused on one-sided operations. However, there is an important class of modern software frameworks, such as HERD and RAMCloud, that still relies on RDMA for fast communication, but only uses it for fast messaging; all remote data is accessed over RPCs. While very flexible, RPCs forego the benefits of one-sided operations in terms of latency and remote CPU involvement. Hardware accelerators for one-sided operations, such as LightSABRes, can provide massive MLP, which is, in general, unattainable with RPCs, as their concurrency is fundamentally limited by the number of available cores.

In the broader sense of RPCs, our proposal for one-sided operations with stronger semantics (such as SABRes) and the addition of destination-side accelerators is semantically as much of an RPC mechanism as it is a one-sided operation. LightSABRes can be perceived as a simple fixed-functionality hardware RPC unit that reaps all the benefits of one-sided operations, and addresses the shortcomings of software RPCs at the price of limited flexibility. Our work is also parallel to a recent line of work on smart NICs [12],

[13]. While we share the vision of adding more and smarter functionality to the network interface, we focus on providing operations with high-level semantics in hardware rather than more sophisticated network packet processing.

Regarding the hardware-software contract, the hardware simplicity of LightSABRes stems from the insight that objects in data stores are structured, and this software-provided guarantee can be harnessed. A similar observation has been made and leveraged before in the context of HTM: object-aware HTM relies on the organization of data as software objects to tackle the capacity limitations of traditional HTM [14].

Regarding the atomic chunk operations, a large body of work has been done in providing atomic access to memory chunks in shared-memory architectures [1], [2], [3], [5], [10], [18], [19], [21]. While these mechanisms can be used in a distributed memory environment to provide SABRes, they deliver broader functionality than simple atomic range reads at the cost of increased hardware complexity and intrusive hardware modifications. In contrast, LightSABRes only require simple and contained extensions to the integrated network protocol controller, without any further chip modifications (e.g., caches, cache and coherence controllers); thus, integration into commercial chips with conventional block-based coherence protocols is more practical.

Regarding memory subsystem support. Tagged memory has been extensively investigated in the context of security and data integrity. Variations of such architectures can also be found on real machines, such as the Soviet Elbrus processors in the 70s, the J-machine in the 90s, and Oracle's recent M7 chip. The hardware tags embedded in memory can be leveraged as a mechanism for concurrency control, e.g., as a hardware implementation of per-cache-line versions. The destination-side protocol controller could use these versions to identify atomicity violations while servicing a SABRe. While functionally similar to its software counterpart, such a hardware mechanism would be significantly more efficient, with the added benefit of leaving the data store's layout unmodified.

HICAMP effectively provides snapshot isolation for all software objects through hardware multiversioning, thus preventing read-write conflicts. Integration of protocol controllers for one-sided operations with HICAMP is an interesting case where SABRes are provided by default, without any special hardware extensions.

In sum, the emergence of highly integrated rack-scale systems employing lightweight communication protocols and high-performance fabrics brings the remote memory access latency down to a bare minimum, within a small factor of local memory. In such systems, any software overheads added on top of the hardware latency for remote memory access are on the critical path and directly impact the end-to-end latency. This is the case for modern software mechanisms that provide atomic access to remote objects, which is a very common operation. We therefore introduced SABRes, a new one-sided operation that provides object atomicity in hardware. Our implementation, LightSABRes, completely removes the software overhead for atomicity enforcement, resulting in remote read throughput improvements of up to 97% for a microbenchmark and up to 60% for a key-value lookup application running on top of the full software stack of a modern distributed object store.

While the invention has been disclosed with reference to certain preferred embodiments, numerous modifications, alterations, and changes to the described embodiments, and equivalents thereof, are possible without departing from the sphere and scope of the invention. Accordingly, it is intended that the invention not be limited to the described embodiments, and be given the broadest reasonable interpretation in accordance with the language of the appended claims.

REFERENCES

[1] C. Blundell, M. M. K. Martin, and T. F. Wenisch, "InvisiFence: performance-transparent memory ordering in conventional multiprocessors." in ISCA, 2009.

[2] L. Ceze, J. Tuck, P. Montesinos, and J. Torrellas, "BulkSC: bulk enforcement of sequential consistency." in ISCA, 2007.

[3] H. Chafi, J. Casper, B. D. Carlstrom, A. McDonald, C. C. Minh, W. Baek, C. Kozyrakis, and K. Olukotun, "A Scalable, Non-blocking Approach to Transactional Memory." in HPCA, 2007.

[4] A. Daglis, S. Novakovic, E. Bugnion, B. Falsafi, and B. Grot, "Manycore network interfaces for in-memory rack-scale computing." in ISCA, 2015.

[5] J. Devietti, B. Lucia, L. Ceze, and M. Oskin, "DMP: deterministic shared memory multiprocessing." in ASPLOS-XIV, 2009.

[6] A. Dragojevic, D. Narayanan, M. Castro, and O. Hodson, "FaRM: Fast Remote Memory." in NSDI, 2014.

[7] M. Franklin and G. S. Sohi, "The Expandable Split Window Paradigm for Exploiting Fine-Grain Parallelism." in ISCA, 1992.

[8] Franklin, Manoj, and Gurindar S. Sohi. "ARB: A Hardware Mechanism for Dynamic Reordering of Memory References," IEEE Transactions on Computers, Vol. 45.5, 1996, pp. 552-571.

[9] C. Gniady, B. Falsafi, and T. N. Vijaykumar, "Is SC+ILP=RC?" in ISCA, 1999.

[10] L. Hammond, B. D. Carlstrom, V. Wong, M. K. Chen, C. Kozyrakis, and K. Olukotun, "Transactional Coherence and Consistency: Simplifying Parallel Hardware and Software." IEEE Micro, vol. 24, no. 6, pp. 92-103, 2004.

[11] N. P. Jouppi, "Improving Direct-Mapped Cache Performance by the Addition of a Small Fully-Associative Cache and Prefetch Buffers." in ISCA, 1990.

[12] A. Kaufmann, S. Peter, T. E. Anderson, and A. Krishnamurthy, "FlexNIC: Rethinking Network DMA." in HOTOS-XV, 2015.

[13] A. Kaufmann, S. Peter, N. K. Sharma, T. E. Anderson, and A. Krishnamurthy, "High Performance Packet Processing with FlexNIC." in ASPLOS-XXI, 2016.

[14] B. Khan, M. Horsnell, I. Rogers, M. Lujan,' A. Dinn, and I. Wat-son, "An Object-Aware Hardware Transactional Memory System." in HPCC, 2008.

[15] C. Mitchell, Y. Geng, and J. Li, "Using One-Sided RDMA Reads to Build a Fast, CPU-Efficient Key-Value Store." in USENIX ATC, 2013.

[16] A. Muzahid, S. Qi, and J. Torrellas, "Vulcan: Hardware Support for Detecting Sequential Consistency Violations Dynamically." in MICRO, 2012.

[17] S. Novakovic, A. Daglis, E. Bugnion, B. Falsafi, and B. Grot, "Scale-out NUMA." in ASPLOS-XIX, 2014.

[18] S. H. Pugsley, M. Awasthi, N. Madan, N. Muralimanohar, and R. Balasubramonian, "Scalable and reliable communication for hardware transactional memory." in PACT, 2008.

[19] X. Qian, J. Torrellas, B. Sahelices, and D. Qian, "BulkCommit: scalable and fast commit of atomic blocks in a lazy multiprocessor environment." in MICRO, 2013.

[20] S. Sethumadhavan, R. Desikan, D. Burger, C. R. Moore, and S. W. Keckler, "Scalable Hardware Memory Disambiguation for High ILP Processors." in MICRO, 2003.

[21] T. F. Wenisch, A. Ailamaki, B. Falsafi, and A. Moshovos, "Mechanisms for store-wait-free multiprocessors." in ISCA, 2007.

The invention claimed is:

1. A distributed memory system comprising:
a plurality of chips, each chip including a plurality of nodes, each node including a dedicated local memory, a network interface, and a processor core, and each local memory configured to be accessible by network communication via the network interface, each network interface configured to enforce coherence of atomic operations within the corresponding chip to form a coherence domain within the corresponding chip;
wherein each of the network interfaces are configured to support a one-sided operation, the network interface directly reading or writing in the dedicated local memory of the corresponding node without involving a processor core,
wherein the one-sided operation is configured such that the processor core of a corresponding node uses a protocol to directly inject a remote memory access for read or write request to the network interface of the node, the remote memory access request allowing to read or write a contiguous region of a memory of a remote node,
wherein a network interface of a requesting node further includes a parser configured to parse the request and send the request to a network interface of a target remote servicing node,
wherein the network interface of the target remote servicing node is configured to directly operate on an associated local memory according to the received request, without an involvement of a processor core of the target remote servicing node, and to reply to the requesting network interface with the requested data, if the request was a read, or a write acknowledgement, if the request was a write, and
wherein a plurality of regions of the dedicated local memory of each node are organized by software as a set of data objects, each of the data objects having a layout including a header having a lock or a version followed by a data of a data object, the network interface using a data object memory layout and the integration of the network interface in a local coherence domain of the network interface, the network interface configured to identify a potential atomicity violation by snooping on coherence messages while one-sided atomic data object read operations by the network interface are performed.

2. A network interface in a distributed memory system according to claim 1, comprising:
a plurality of object buffers,
wherein each object buffer includes an object address field, followed by a plurality of object buffer entries, and
wherein each object buffer entry includes two bits to encode any one of four possible states from the following list: unused, used, pending, done, an initial state of the object buffer being unused.

3. A method for implementing a lightweight mechanism configured to extend a network interface to provide atomic reads of arbitrarily long data objects, each object comprising a header followed by data of the object stored in object buffers, the header including a lock or a version, the method comprising:
integrating the network interface in a local coherence domain of the network interface;
snooping on the network interface on coherence messages, to identify potential atomicity violations while a data object is being read;
assigning by the network interface one of the available object buffers to the remote object read request, whenever the network interface receives a remote object read request from the network the network interface stores a base address of the object in an object address field of the object buffer, and the first N entries of the object buffer are marked as used, where N is the total number of cache blocks that the object requested by the remote object read request is comprised of, wherein an object buffer entry (i) corresponds to the cache block (i) of the requested object;
speculatively sending by the network interface read requests for the cache blocks of the object and assessing a state of the lock or a state of the version, marking corresponding object buffer entries of the object as pending, consequently marking them as done as the data replies from memory arrive and sending the data replies back to the original requester through the network, wherein all data cache block reads completed by the network interface are speculative until the header of the object is retrieved and assessed,
wherein when the state of the lock or the state of the version indicates a free object, a cache block read that has been speculatively completed prior to assessing the header of the object qualifies as valid with respect to a layout of the object;
else, the speculative cache block reads fail, and the network interface performs a failure sequence, which involves either one of reading the cache blocks of the object again, or sending a failure notification to a network interface that originally sent the remote object read request, the failure notification being a network message to the network interface that performed the read request;
in case the network interface receives a coherence invalidation message for an address that belongs in an address range of the data object, the network interface,
checks whether the invalidation matches a first entry of the object buffer, which corresponds to a header of the data object, and if this is the case, the object read request fails and the network interface performs a failure sequence for that object read request;
checks whether the invalidation matches an entry of the object buffer that is not unused and is not the first entry of the object buffer, and if the first entry of the object buffer is in the done state, the invalidation is ignored;
otherwise, the reception of an invalidation for an entry of the object buffer that is in the done state results in the network interface performing a failure sequence for the object read request corresponding to that object buffer;
wherein a one-sided atomic data object read request successfully completes when all the cache blocks comprising the requested object have been read from the memory, and
wherein the network interface frees the object buffer used for the request by resetting all of the entries of the object buffer to unused.

4. The method of claim 3, further comprising
checking a number of entries in an object buffer, if the object buffer features fewer entries than a total of cache lines of the requested data object, bounding the number of speculative cache block reads that the network interface can issue for that data object, by the available entries;

if the access to the header of the data object has not completed, the network interface stalls the processing of the atomic read request of the data object until the first access completes, thereby only having a negative impact on performance, but not introducing a functionality limitation, such that the maximum size of the data object that the network interface can read atomically is not limited by the number of entries of the object buffers of the network interface.

* * * * *